Dec. 10, 1963 A. H. FAULKNER 3,114,051
ELECTRONIC DETECTOR FOR USE WITH IMPULSE REGENERATORS
Filed Dec. 12, 1958
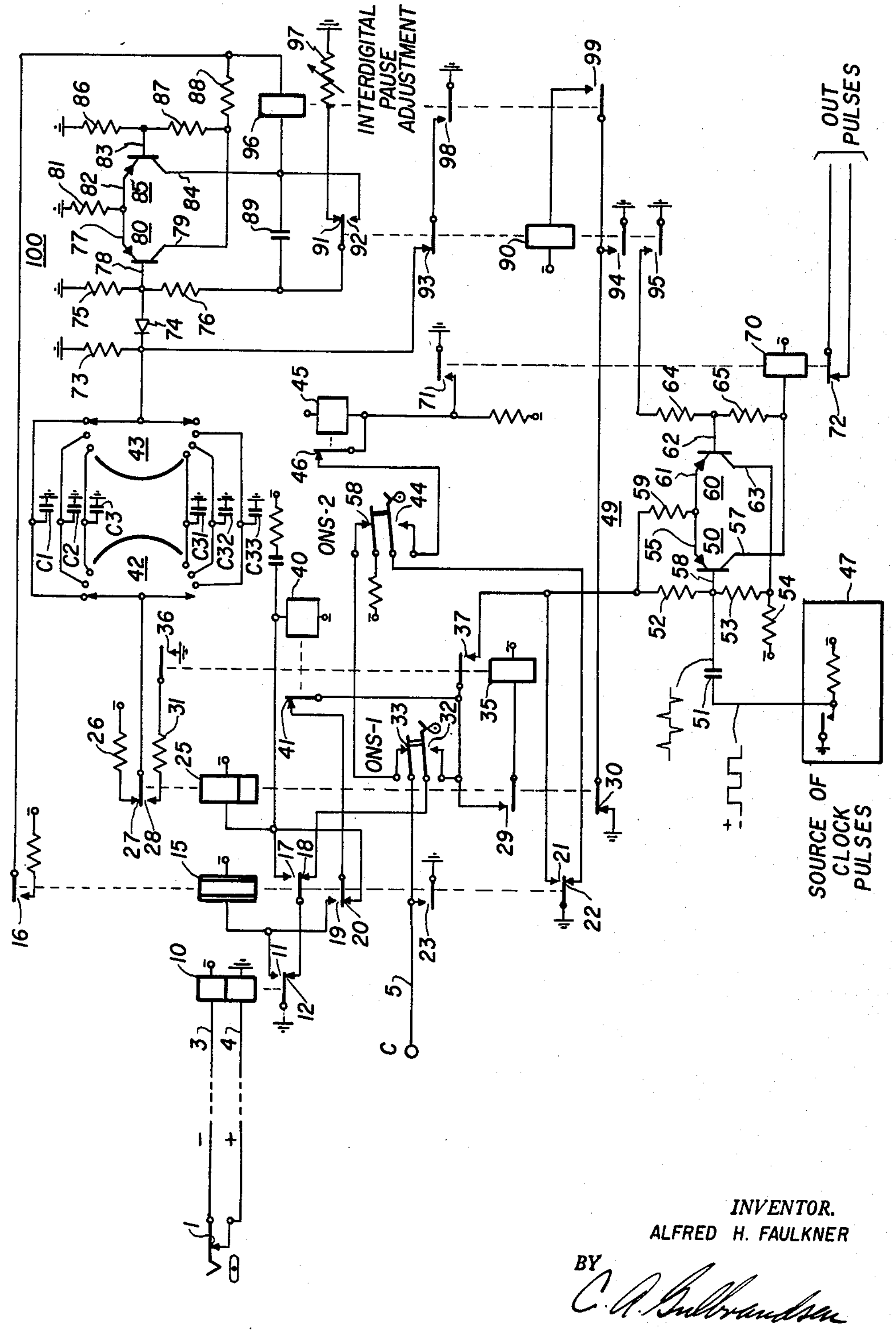
INVENTOR.
ALFRED H. FAULKNER
BY C. A. Gulbrandsen
ATTY.

United States Patent Office 3,114,051

Patented Dec. 10, 1963

3,114,051

ELECTRONIC DETECTOR FOR USE WITH IMPULSE REGENERATORS

Alfred H. Faulkner, Redondo Beach, Calif., assignor to Automatic Electric Laboratories, Inc., a corporation of Delaware Filed Dec. 12, 1958, Ser. No. 780,125
1 Claim. (Cl. 307—88.5)

This invention relates in general to impulse regenerators and in particular to impulse regenerators of the type utilizing electronic means for detecting the stored digital information.

In the telephone art it is often necessary to correct dial pulses as to their amplitude, wave shape, or both. Pulse repeaters are generally used to accomplish this purpose, and, since a new pulse is transmitted as each dial pulse is received, it is unnecessary to have digit storage facilities.

An impulse regenerator however, not only corrects for pulse wave form and amplitude distortion but also compensates for frequency deviation of the incoming pulse train. Assuming that a frequency of 10 p.p.s. is desirable for existing switching facilities and that incoming dial pulse frequency may range between 8 p.p.s. and 12 p.p.s., it is at once apparent that a new pulse cannot be generated upon reception of each of the old pulses if the desired 10 p.p.s. frequency is to be attained. Therefore, it is necessary to provide some means for storing the incoming impulses before beginning transmission of outgoing impulses.

Impulse regenerators of the prior art utilized a variety of elements as storage devices. Among these were relays and rotary switches. Capacitors were also employed, but since sensitive detecting means were not used, the storage system generally proved expensive and bulky. Applicant's electronic detecting circuit makes it feasible to use small inexpensive components, such as small capacitors and magnetic cores, as storage elements in impulse regenerators.

Accordingly, it is an object of this invention to provide an impulse regenerator, compatible with existing telephone switching facilities, which utilizes small inexpensive components such as, electrolytic capacitors and magnetic cores, as storage elements.

Another object is to provide a novel electronic type detecting circuit for detecting the potential on marked ones of a group of small storage capacitors.

A feature of this invention is the provision of a novel detecting circuit in an impulse regenerator for controlling transmission of regenerated pulses and also for timing output interdigital pause periods.

Another feature of this invention is the use of an electronic pulse amplifying circuit in an impulse regenerator which permits the use of a common, low powered, electronic source of accurately timed voltage pulses for controlling the regenerator output pulse frequency.

Other objects and features of the invention will be apparent from a reading of the specification taken in conjunction with the drawings in which:

FIG. 1 is a schematic representation of an impulse regenerator utilizing small electrolytic capacitors as storage elements.

Referring now to FIG. 1 of the drawings, a brief description of the operation of this impulse regenerator, which uses capacitor storage, will be given. The regenerator is seized and held in a conventional manner. As digital impulses are received from the preceding equipment, the wiper of a rotary switch 42 is stepped, in synchronism with the received impulses, across a series of individual storage capacitors C1–C33. During each interdigital pause between impulse series a marking circuit is completed through the rotary switch wiper to the capacitor then in contact with the wiper. The charging of the capacitor indicates the digit registration. Succeeding digits are stored in a similar manner.

At the time of seizure, operating potentials are applied to a transistorized detecting circuit 100 and to a transistorized pulse amplifying circuit 49. Detecting circuit 100 is connected at this time for monostable operation. The base electrode of one of the detecting circuit transistors 80 is connected to the switch wiper of another rotary switch 43, the bank contacts of which are also connected to the individual storage capacitors. The normally "off" transistor 80 of the monostable combination is rendered conductive due to a base potential applied from battery over the wipers and first bank contacts of both of the switches. Upon receipt of the first digital impulse this base potential is removed and the detecting circuit assumes its stable condition. When this condition has been reached, a circuit, which will be completed during the first interdigital pause period, is prepared for rendering the monostable detecting circuit 100 bistable, and for operating the pulse amplifier 49.

A common pulse generator or source of clock pulses 47 is connected through a differentiating capacitor to the base of the normally "off" transistor 50 of the pulse amplifier, which transistor has an output pulsing relay 70 connected in its collector circuit. The differentiating capacitor acts to convert the square wave voltage output from the common pulse generator into a series of positive and negative voltage pips. The positive voltage pips generate small pulses of collector current in the "off" transistor, but these pulses are insufficient to operate the pulsing relay.

During the interdigital pause after the receipt of the first digit, an aforementioned circuit is completed which renders the detecting circuit 100 bistable, and connects a ground potential to the base of the "on" transistor 60 in the pulse amplifier 49. Now, the next positive voltage pip to the base of the "off" transistor of the pulse amplifier switches the "on" transistor "off" and locks the previously "off" transistor "on". The collector current is now sufficient to operate the pulsing relay 70. The pulsing relay, in addition to transmitting output pulses, also causes the motor magnet 45 of the second switch 43 to operate. Upon restoration of the pulsing relay, the motor magnet restores and steps the switch wiper to the next contact. This process is repeated until the switch wiper of the second switch 43 rests on its bank contact associated with the marked capacitor. The charge on the marked capacitor is impressed on the base of the non-conducting transistor 80 of the detecting circuit 100, which, it will be remembered, is now bistable and causes this transistor to be switched "on." The change in state of the detecting circuit causes it to revert to monostable operation. The pulse amplifier 49, in response to the detecting circuit, also reverses terminating the operation of the output pulsing relay and the stepping of the second switch.

When the detecting circuit 100 is switched by the application of the charge of the marked capacitor to the base of its non-conducting transistor 80, an erasing circuit is closed which neutralizes the charge on the marked capacitor. The now monostable detecting circuit is in an unstable state and will remain so if another digit has not been received. If another digit has been stored or is in the process of being stored, then the base battery potential necessary to hold the detecting circuit in its unstable state will not be present and it will assume its stable condition. Usually a second digit will either have been stored or be in the process of being stored and the time required for the detecting circuit to switch from its unstable to its stable condition will determine the pause period between the output impulse series. When the detecting circuit reaches its stable state, it is again immediately converted for bistable operation and the above processes are repeated.

A detailed explanation of the operation of the circuit of FIG. 1 will now be given. The regenerator is marked idle to other switches by battery impressed on lead 5 via off-normal spring contacts 58 and 33. The switch is seized in a well known manner and a loop circuit is closed to operate relay 10. Relay 10 in operating closes, at contact 11, an operating path for relay 15. Relay 15 in operating prepares, at contact 17, operating paths for relay 25, motor magnet 40 and relay 35. At contact 16 battery potential is connected to the detecting circuit 100, comprising transistors 80 and 85, and at contact 21 ground potential is connected to the pulse amplifier circuit 49, comprising transistors 50 and 60. At contact 23 ground is connected to lead 5 to mark the regenerator "busy" to other switches.

For the sake of clarity the process of storing an incoming digit will be discussed before analyzing the effects of the aforementioned potentials on the detecting and pulse amplifying circuits. Assume that the digit "2" is dialed by the subscriber. On the return of the dial, contact 1 of the subscriber's subset opens (for the first time) and relay 10 restores. Relay 10 in restoring completes, at contact 12, obvious operating paths for relay 25 and motor magnet 40. Rotary switch 42 is the type that steps upon restoration of its motor magnet and consequently no stepping occurs at this time. Relay 25 in operating removes, at its contact 27, battery potential from the switch wiper of switch 42 and prepares, at its contact 28, to place ground potential thereon. At contact 29, an operating path is prepared for relay 35.

As the dial of the subscriber's telephone continues moving toward its normal position, contact 1 recloses and relay 10 is reoperated. The operating path to relay 15 is again completed, helping to maintain this relay, which is slow-to-release, operated during the open periods of contact 1. At contact 12 the operating path to motor magnet 40 is broken. Motor magnet 40, in restoring, causes the switch wiper of switch 42 to step to the next bank contact and, due to the reclosure of its interrupter spring contact 41, an operating path to relay 35 is completed. This path is as follows: battery, relay 35, contact 29 of relay 25, which also remains operated during the open period of contact 1 due to its slow-to-release feature, interrupter spring contact 41, contact 19, contact 11, and ground. Relay 35 locks to ground via contact 21, its contact 37, and contact 29. At contact 36 a ground circuit is completed to the wiper of switch 42. When switch 42 was stepped, its off-normal spring contacts 32 and 33 restored, but these operations have no significance at this time.

The storage elements in this regenerator are small individual electrolytic capacitors, C1 to C33 connected between ground and the paralleled bank contacts of switches 42 and 43. For the purposes of clarity, only a few of these capacitors are shown. The ground which has been connected to the wiper of switch 42 is now effective to neutralize any charge present on capacitor C2.

The subscriber's dial opens the line loop at contact 1 for the second time and relay 10 restores. Motor magnet 40 reoperates, and its interrupter spring contact 41 opens the original operating path to relay 35, but this relay remains operated over the holding path previously described. Relay 25 is energized again to help keep it operated during the open periods of contact 1. Contact 1 now closes and remains closed during the interdigital pause period and relay 10 reoperates. Motor magnet 40 is deenergized and the wiper of switch 42 steps to its third bank contact. After a brief delay relay 25 restores, and at contact 29 restores relay 35. Relay 35 in restoring further opens, at its contacts 36, the open ground circuit to the switch wiper of switch 42. This relay is incorporated in the circuit to guard against the accidental discharge of a marked capacitor when a subsequent digit is received. Relay 25 in restoring also reconnects, at its contact 27, resistance battery to the switch wiper of switch 42 which is now connected to capacitor C3. Capacitor C3 charges over this path which consists of battery, resistance 26, contact 27, the switch wiper of switch 42, capacitor C3, and ground. Relay 25 also connects ground at its contact 30 to relay 90 which, as will be shown presently, will complete an operating path to relay 90.

Returning now to a time just prior to seizure of the regenerator, it will be noted that transistor 80 of detecting circuit 100 is conductive along its emitter-base path. This path is as follows: ground, resistance 81, emitter 77 and base 78 of transistor 80, diode 74, the switch wiper of switch 43 which is resting on its first bank contact, the junction wire interconnecting the first bank contacts of switches 42 and 43, the switch wiper of switch 42, contact 27, resistance 26, and negative battery.

Upon seizure, closure of contact 16 renders transistor 80 conductive along its emitter-collector path as follows: ground, resistance 81, emitter 77 of transistor 80, collector 79, resistance 88, contact 16, and resistance battery. Emitter 77 of transistor 80 is connected to emitter 82 of transistor 85, hence there can be no potential difference between them. As transistor 80 conducts along its emitter-collector path, its emitter 77 is rendered less positive due to the potential drop in resistance 81. Consequently, emitter 82 of transistor 85 is rendered less positive and this transistor is prevented from conducting. It will be noted that these transistors are connected for monostable operation since capacitor 89 is connected between base 78 of transistor 80 and collector 84 of transistor 85. However, the arrangement is maintained in an unstable state due to negative battery applied to base 78 of transistor 80 through diode 74.

When relay 25 operates upon receipt of the first incoming digital impulse, it removes this negative potential from the switch wiper of switch 42 and hence from base 78 of transistor 80. As a result the emitter base current of transistor 80 is diverted through resistor 76, capacitor 89, relay 96, contact 16, to negative battery. Capacitor 89 begins to charge and drives base 78 more and more positive which results in transistor 80 being driven to cut-off. As transistor 80 is driven towards its non-conductive state, its emitter potential is raised, allowing transistor 85 to conduct. The emitter-collector current path of transistor 85 is as follows: ground, resistance 81, emitter 82 of transistor 85, collector 84, relay 96, contact 16, and resistance battery. Over this path relay 96 operates.

Relay 96 in operating completes a shunting ground path at contact 98 to capacitor C1, thereby discharging this capacitor. At contact 99 an operating path for relay 90 is prepared, which path is still incomplete at contact 30. When relay 25 restores during the first interdigital pause, this operating path is completed and relay 90 operates and locks. Relay 90 in operating shorts out, at contact 92, capacitor 89 and converts detecting circuit 100 from monostable to bistable operation. Since detecting circuit 100 is now bistable, transistor 80 may be switched on (thus switching transistor 85 off) by application of negative potential to its base 78.

The pulse amplifying circuit 49 comprises a pair of transistors 50 and 60 connected as a multivibrator. A source of timed voltage pulses 47, which may be a pulse generator, preferably an electronic one employing transistors, is connected through a small capacitor 51 to base 56 of transistor 50. Capacitor 51 differentiates the rectangular output wave form of pulse generator 47 to impress a series of alternatnig voltage pips on the base of transistor 50.

Returning again to seizure, ground is connected via contact 21 to pulse amplifying circuit 49, and since the ground to base 62 of transistor 60 is open at contact 95, transistor 60 conducts. When transistor 60 conducts along its emitter-collector path, its collector 63 swings positive and prevents transistor 50 from conducting. The voltage pips applied to the base of transistor 50 give rise to corresponding brief pulses of collector current in this transistor, but these brief pulses of current are insufficient to operate output pulsing relay 70, which is connected in its collector circuit.

As mentioned previously, relay 25 restores during the interdigital pause period, completing an operating path for relay 90, and relay 90 operates and locks. To repeat, relay 90 in operating shorts out capacitor 89, thus converting the monostable detecting circuit 100 for bistable operation. Under these conditions negative voltage applied to the base of transistor 80 will cause the circuit to switch.

Relay 90 in operating also opens, at its contact 93, the ground circuit to the wiper of switch 43 to preclude the possibility of discharging a marked capacitor. At contact 95 ground is connected via resistor 64 to base 62 of transistor 60.

It will be remembered that voltage pips are continuously applied to base 56 of transistor 50. The spacing of these pips determines the impulse ratio of the outgoing impulses from the regenerator. It will also be recalled that with relay 90 unoperated, the brief pulses of collector current in transistor 50 were insufficient to operate relay 70. However, with relay 90 operated, the brief pulse of collector current in transistor 50 during a positive voltage pip is effective to cut off transistor 60, causing its collector 63 to swing negative and switch transistor 50 on in the usual manner. When transistor 50 locks in its conductive state, relay 70 operates. Relay 70 in operating opens, at contact 72, the outgoing pulse loop, and at contact 71 completes an operating circuit to motor magnet 45.

Transistor 50 remains conductive until a subsequent negative voltage pip drives it to cut off, causing the circuit to revert to its previous state, that is, with transistor 60 conducting. Relay 70 restores, reclosed the outpulsing loop at contact 72, and breaks the circuit to motor magnet 45. Upon the restoration of motor magnet 45 the switch wiper 43 is stepped to its next bank contact. Succeeding positive and negative voltage pips applied to the base of transistor 50 cause relay 70 to operate and restore as previously described and the switch wiper of switch 43 is stepped upon each restoration of relay 70.

Since the first received digit was assumed to be a 2 capacitor C3 was negatively charged. After relay 70 has transmitted two outgoing impulses to the line, the switch wiper of switch 43 engages the bank contact to which capacitor C3 is connected. The negative voltage on capacitor C3 is impressed on base 78 of transistor 80 via the switch wiper of switch 43 and diode 74. This negative potential causes the detecting circuit 100 to switch, rendering transistor 80 conductive and transistor 85 non-conductive. When transistor 85 becomes nonconductive, relay 96 restores and at its contact 99 restores relay 90. Relay 90 in restoring removes, at contact 95, the ground to base 62 of transistor 60. Succeeding voltage pips applied to the base of transistor 50 are again ineffective to operate relay 70 and the transmission of outgoing impulses is terminated.

At this time another digit will ordinarily be stored or be in the process of being stored and the switch wiper of switch 42 will not be resting on its bank contact associated with capacitor C3. Therefore, the detecting circuit 100, in absence of the holding battery on base 78 of transistor 80, will revert to its stable condition, i.e. with transistor 85 conducting. The time required for this switching action to occur will be determined by the charging time of capacitor 89. This capacitor charges through resistors 75 and 76 which are connected in parallel with variable resistance 97. Variable resistance 97 is utilized to permit adjustment of the RC time constant and hence the outgoing interdigital pause period.

If another digit has not as yet been received, the switch wiper of switch 42 would be resting on the bank contact connected to capacitor C3. Relay 25 would be restored and battery would be impressed via resistance 26, contact 27, the switch wiper of switch 42, the junction wire between the third bank contacts of switches 42 and 43, the switch wiper of switch 43, and diode 74 to the base 78 of transistor 80, thus holding this transistor conductive pending receipt of another digit. If another digit has been stored or is in the process of being stored, relay 90 would reoperate during the next incoming interdigital pause period and transmission of output pulses would take place as previously described.

The above procedure is repeated for the remaining incoming digits. When the impulse regenerator has transmitted the corresponding series of output impulses, "switch through" or some other appropriate switching action occurs, breaking the hold path for relay 10. Relay 15, after the passage of its slow-to-release time, restores. The regenerator is not marked idle to other switches since resistance battery is prevented from appearing on control lead 5 due to open off-normal springs 33 and 58. Relay 15 in restoring closes, at contact 18, an operating path to motor magnet 40. This path is as follows: ground, contact 12, contact 18, restored off-normal spring contact 32, motor magnet interrupter spring contact 41, contact 20, motor magnet 40, and negative battery. Since the interrupter spring contact 41 is now serially connected in the operating path of motor magnet 40, motor magnet 40 operates self-interruptedly and steps the switch wiper of switch 42 around to its normal position. When switch 42 is at normal, its off-normal spring contact 32 operates and prevents any further stepping.

A similar circuit exists for motor magnet 45. This path is as follows: ground, contact 22, restored off-normal spring contact 44, motor magnet interrupter spring contact 46, motor magnet 45, and battery. Over this path motor magnet 45 operates in a self-interrupted manner and steps the switch wiper of switch 43 to its normal position. When switch 43 is at normal, its off-normal spring contact 44 operates breaking the circuit to motor magnet 45 and prevents any further stepping. When both switch 42 and 43 have been returned to normal, off-normal springs 33 and 58 are operated and permit resistance battery to be impressed upon lead 5, thereby marking this regenerator idle to other equipment.

It will be noted that relays 25 and 35 are held operated during the return stepping of switch 42. Thus, a solid ground is kept on the switch wiper resulting in the neutralization of any charge on the storage capacitors.

All of the transistors shown in the above circuits are of the PNP type but NPN types can readily be employed by one skilled in the art.

While the invention has been described with a certain degree of particularity, it is apparent that numerous modifications may be made without departing from the true spirit and scope of the invention as defined in the claim.

What is claimed is:

In combination a bistable flip-flop circuit including a first and second transistor each having a base electrode, an emitter electrode and a collector electrode, the second transistor being normally conductive, means for applying a potential to the base electrode of the first transistor to render the first transistor conductive and render the second transistor nonconductive, means to render the first transistor nonconductive and render the second transistor conductive in monostable fashion comprising: a capacitor connected to the base electrode of the first transistor; relay means connected to the collector electrode of the second transistor rendered inoperative in response to the rendering of the first transistor conductive to remove a shunt path to charge the capacitor to a predetermined potential; the second transistor rendered conductive and the first transistor rendered nonconductive in response to the capacitor being charged to the predetermined potential, the relay means rendered operative in response to the first transistor being rendered nonconductive, and the capacitor discharged in response to the relay means being rendered operative.

References Cited in the file of this patent

UNITED STATES PATENTS

| | | |
|---|---|---|
| 2,541,230 | Fleming-Williams | Feb. 13, 1951 |
| 2,665,845 | Trent | Jan. 12, 1954 |
| 2,827,574 | Schneider | Mar. 18, 1958 |
| 2,862,198 | Stuart-Williams | Nov. 25, 1958 |
| 2,889,538 | Geisler | June 2, 1959 |
| 2,890,439 | Bird | June 9, 1959 |
| 2,891,195 | Smyth | June 16, 1959 |
| 2,895,058 | Pankove | July 14, 1959 |
| 2,896,094 | Moody | July 21, 1959 |
| 2,901,735 | Lawrence | Aug. 25, 1959 |
| 2,939,018 | Faulkner | May 31, 1960 |
| 2,995,687 | Mayberry | Aug. 8, 1961 |
| 3,008,088 | Beeler | Nov. 7, 1961 |
| 3,010,053 | Schubert | Nov. 21, 1961 |